United States Patent US 12,327,136 B2
Zaykov et al. Date of Patent: Jun. 10, 2025

(54) SYSTEMS AND METHODS FOR REGULATING MEMORY UTILIZATION FOR COPROCESSORS

(71) Applicant: Honeywell International s.r.o., Chodov (CZ)

(72) Inventors: Pavel Zaykov, Brno (CZ); Humberto Carvalho, Vila Real (CZ); Larry James Miller, Black Canyon City, AZ (US)

(73) Assignee: Honeywell International s.r.o. (CZ)

(*) Notice: Subject to any disclaimer, the term of this patent is extended or adjusted under 35 U.S.C. 154(b) by 860 days.

(21) Appl. No.: 17/500,552

(22) Filed: Oct. 13, 2021

(65) Prior Publication Data
US 2023/0111174 A1 Apr. 13, 2023

(51) Int. Cl.
G06F 9/46 (2006.01)
G06F 9/50 (2006.01)
G06N 3/04 (2023.01)

(52) U.S. Cl.
CPC .......... *G06F 9/5016* (2013.01); *G06F 9/467* (2013.01); *G06F 9/5038* (2013.01); *G06N 3/04* (2013.01)

(58) Field of Classification Search
CPC ...... G06F 9/5016; G06F 9/5038; G06F 9/467; G06N 3/04
See application file for complete search history.

(56) References Cited

U.S. PATENT DOCUMENTS 10,768,984 B2  9/2020  Varadarajan et al.
10,908,955 B2  2/2021  Varadarajan et al.
(Continued)

FOREIGN PATENT DOCUMENTS

CN  111984400 A  11/2020
CN  112732436 A  4/2021
(Continued)

OTHER PUBLICATIONS

European Patent Office, "Summons to attend oral proceedings pursuant to Rule 115(1) EPC", dated Jul. 23, 2024, from EP Application No. 22187453.0, from Foreign Counterpart to U.S. Appl. No. 17/500,552, pp. 1 through, 9, Published: EP.
(Continued)

*Primary Examiner* — Tammy E Lee
(74) *Attorney, Agent, or Firm* — Fogg & Powers LLC

(57) ABSTRACT

Systems and methods for regulating memory utilization for coprocessors are provided. In one embodiment, a computing system comprises: a processor; a compute processor configured to execute one or more kernels; a memory coupled to the processor and the compute processor. The system is configured to: allocate at least one task memory transaction quota to at least a first set of tasks executed on a first core of the processor; allocate at least one compute processor memory transaction quota for executing the kernels on the compute processor; execute within a first timing window iteration the first set of tasks and the kernels, wherein the kernels are executed during the first timing window iteration until the compute memory transaction quota is depleted; and regulate a rate of memory transaction access by the one or more kernels to the memory when the first set of tasks are executing on the processor.

18 Claims, 5 Drawing Sheets

(56) References Cited

U.S. PATENT DOCUMENTS

| | | | |
|---|---|---|---|
| 2005/0197977 | A1 | 9/2005 | Buck et al. |
| 2009/0217280 | A1 | 8/2009 | Miller et al. |
| 2012/0051369 | A1 | 3/2012 | Bryan et al. |
| 2014/0189700 | A1* | 7/2014 | Williams ............ G06F 13/4027 718/104 |
| 2015/0106649 | A1* | 4/2015 | Kannan .................. G06F 21/85 713/501 |
| 2019/0294472 | A1 | 9/2019 | Varadarajan et al. |
| 2020/0371840 | A1 | 11/2020 | Zaykov et al. |
| 2020/0401450 | A1 | 12/2020 | Varadarajan et al. |
| 2021/0064997 | A1 | 3/2021 | Lee et al. |
| 2022/0044114 | A1* | 2/2022 | Sriram .................. G06N 3/045 |
| 2022/0244870 | A1* | 8/2022 | Duan .................... G06F 3/0653 |

FOREIGN PATENT DOCUMENTS

| | | |
|---|---|---|
| EP | 3543852 A1 | 9/2019 |
| FR | 3096491 A1 | 11/2020 |

OTHER PUBLICATIONS

"The Difference Between Artificial Intelligence, Machine Learning and Deep Learning", downloaded from internet Aug. 3, 2021, pp. 1 through 5, Intel Corporations, www.intel.com/content/www/us/en/artificial-intelligence/posts/different-between-ai-machine-learning-deep-learning.html.

"The Difference Between Deep Learning Training and Inference", downloaded from internet Aug. 3, 2021, pp. 1 through 4, Intel Corporation, www.intel.com/content/www/us/en/artificial-intelligence/posts/deep-learning-training-and-inference.html.

European Patent Office, "Communication pursuant to Article 94(3)", from EP Application No. 22187453.0, from Foreign Counterpart to U.S. Appl. No. 17/500,552, filed Dec. 18, 2023, pp. 1 through 4, Published: EP.

Benedikt, et al., "Thermal-Aware Scheduling for MPSoC in the Avionics Domain: Tooling and Initial Results", 2021 IEEE 27th International Conference on Embedded and Real-Rime Computing Systems and Application (RTCSA). Aug. 18, 2021, pp. 159 through 168.

European Patent Office, "Extended European Search Report", from EP Application No. 2187453.0, from Foreign Counterpart to U.S. Appl. No. 17/500,552, Jan. 20, 2023, pp. 1 through 8, Published: EP.

Sayfan, "Mastering Kubernetes, Automating container deployment and management", Jan. 1, 2017, as downloaded on Jul. 8, 2021 from http://ndl.ethernet.edu.et/itstream/123456789/40210/2/115Gigi%20Sayran.pdf, pp. Cover through 371.

Yun et al., Memory Bandwidth Management for Efficient Performance Isolation in Multi-Core Platforms, IEEE Transactions on Computers, Feb. 2016, vol. 65, No. 2, pp. 562 through 576.

\* cited by examiner

SYSTEMS AND METHODS FOR REGULATING MEMORY UTILIZATION FOR COPROCESSORS

STATEMENT REGARDING FEDERALLY SPONSORED RESEARCH OR DEVELOPMENT

This invention was made with Government support under Contract No.: 945535 awarded by Clean Sky 2 Joint Undertaking. The Government has certain rights in the invention. The project leading to this application has received funding from the Clean Sky 2 Joint Undertaking under the European Union's Horizon 2020 research and innovation program under grant agreement No 945535.

BACKGROUND

Safety-critical computing systems, such as used for avionics applications, often employ space and time partitioning schemes used in conjunction with a real-time operating system (RTOS). The ARINC 653, avionics application standard software interface, is one such example. In ARINC 653 systems, partitions are scheduled by a priority preemptive scheduler to be executed in periodic windows (often referred to as "time slices", or just "slices"). Within these time slices, one or more processes (often referred to as "tasks") execute. The tasks can be periodic or aperiodic. At each scheduling point, the operating system determines the highest priority task that is ready to run, and schedules it. Once a task begins, it may continue to run until it completes its process, is preempted by a higher priority task, or until the partition's time slice expires.

System components utilizing Artificial Intelligence (AI) are also now being deployed along side, or integrated into, these safety-critical computing systems in the form of AI coprocessor inference engines, where kernels executed on the AI coprocessors share memory resources used by the tasks. The deep neural networks (DNNs) executed with these kernels involve a high number of matrix-operations that generate very high memory throughput in order to load and store information such as input data, DNN weights, and other data. On such computing systems, the AI coprocessor thus significantly utilizes the shared DDR memory bus, and thus may delay parallel memory operations from the applications executed by the main processor, introducing latency that leads to worst case execution time (WCET) increases. The kernels may thus be comprised of kernels performing highly computation-intensive matrix operations such as those used in DNN inference, and/or include non-intensive compute operations such as point-wise mathematical operators."

For the reasons stated above and for other reasons stated below which will become apparent to those skilled in the art upon reading and understanding the specification, there is a need in the art for system and methods for regulating memory utilization for artificial intelligence coprocessors.

SUMMARY

The Embodiments of the present disclosure provide methods and systems for regulating memory utilization for coprocessors and will be understood by reading and studying the following specification.

In one embodiment, a computing system comprises: a processor comprising at least one core; a compute processor configured to execute one or more kernels; a memory coupled to the processor and the compute processor; wherein the computing system is configured to: allocate at least one task memory transaction quota to at least a first set of tasks executed on a first core of the processor; allocate at least one compute processor memory transaction quota for executing the one or more kernels on the compute processor; execute within a first timing window iteration the first set of tasks and the one or more kernels, wherein the one or more kernels are executed during the first timing window iteration until the at least one compute memory transaction quota for executing the one or more kernels on the compute processor is depleted; and regulate a rate of memory transaction access by the one or more kernels to the memory when the first set of tasks are executing on the processor.

DRAWINGS

Embodiments of the present disclosure can be more easily understood and further advantages and uses thereof more readily apparent, when considered in view of the description of the preferred embodiments and the following figures in which:

FIG. 1 is a diagram of an example computing system embodiment implementing memory transaction quotas and AI coprocessor rate limiting.

FIG. 2 illustrating an example timeline for an embodiment where processes are executed during a timing window iteration and managed based on memory transaction quotas.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized, and that logical, mechanical, and electrical changes may be made without departing from the scope of the present disclosure. The following detailed description is, therefore, not to be taken in a limiting sense.

Embodiments of the present disclosure provide for the implementation of memory transaction quotas and rate limiting to regulate memory transactions on a computer system comprising single-core or multicore processors and artificial intelligence (AI) coprocessor that share a common memory. Although the embodiments present here are useful for ARINC 653 systems and may be discussed in the context of ARINC 653 related examples, it must be appreciated that these embodiments are not so restricted. Indeed, these embodiments are applicable to, and may be implemented by, other computing system including those not implementing priority preemptive scheduling or preemptive multitasking and used in computing environments other than for aircraft or other vehicles.

Figure 1:
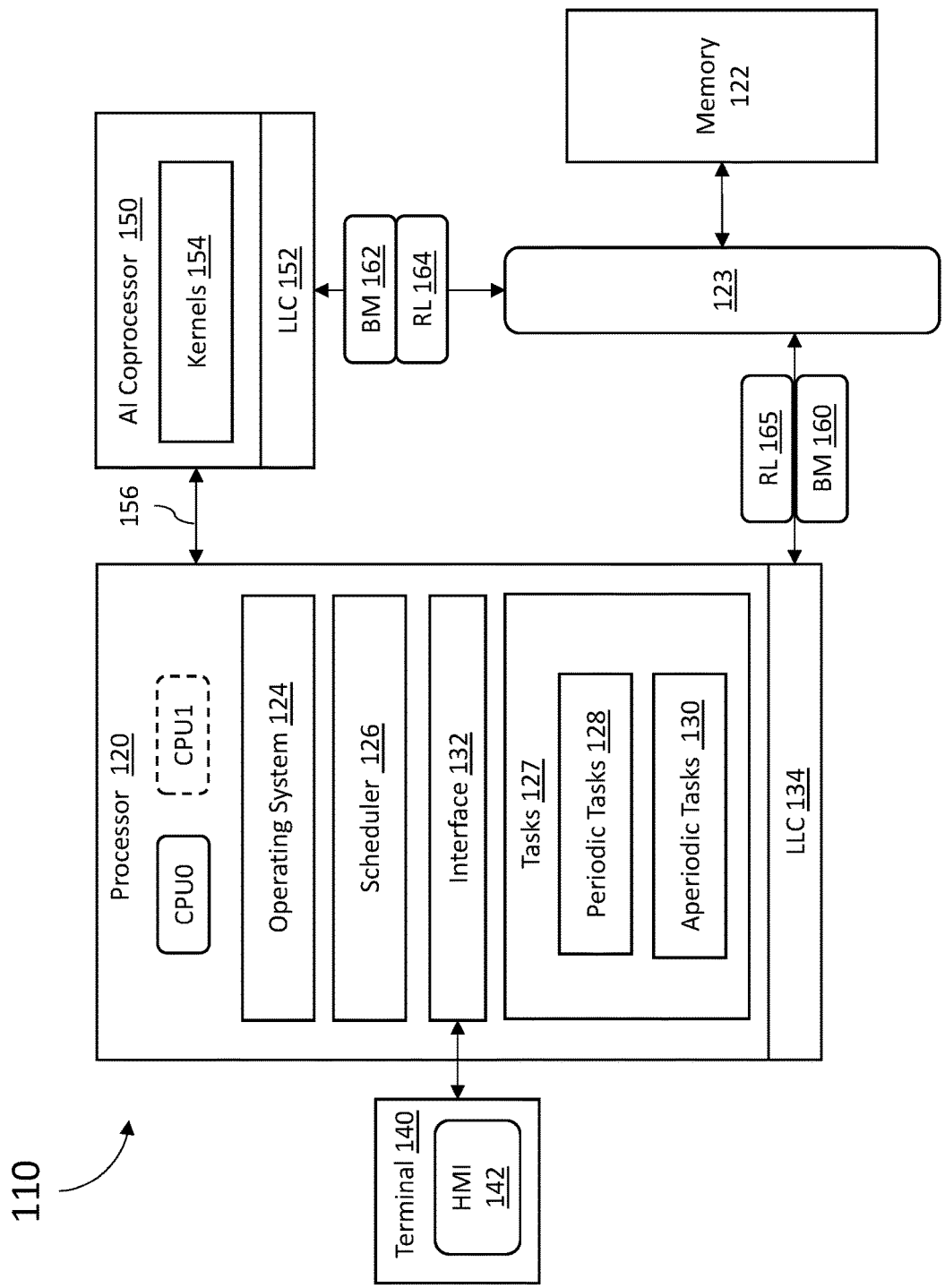

In FIG. 1 a computing system 110 is shown that includes a processor 120 coupled to a memory 122. The computing system 110 includes an operating system 124 and a scheduler 126 that, in this embodiment, implements priority pre-emptive scheduling for a set of tasks 127. These tasks may include any combination of periodic tasks 128 and/or aperiodic tasks 130 that are to be executed by the processor 120. The processor 120 may comprise or is otherwise coupled to a last-level cache (LLC) 134, through which it is coupled to the memory 122. The memory 122 may comprise dynamic random-access memory (DRAM) or other form of memory. In the examples discussed herein, the processor 120 is described in terms of being a multicore processor having two processing cores delineated as CPU0 and CPU1. However, it should be understood that in alternate embodiments the processor 120 may have any number of one or more processing cores (i.e., either a single-core or multi-core processor), with the embodiments described herein applied to the number of processing cores present in the same manner as disclosed herein for CPU0 and/or CPU1. It should be appreciated that an AI coprocessor can be integrated into silicon with CPU cores or can be a discrete part with its own memory. The strategies described herein can be applied to either system memory or the AI coprocessor's local memory.

In some embodiments, the operating system 124 is a real-time operating system (RTOS) that facilitates the execution of real-time applications to process data as it comes in within specified time constraints, often referred to as deadlines. The executed processes, which are referred to herein as "tasks", comprise applications executed by the processor 120 and are allocated time for execution by the scheduler 126 and may also be assigned a priority. Once a task begins execution, it continues until it completes its process, until it is stopped by the operating system 124, or until the time frame for the partition expires, except as otherwise described below. It should be understood that any one partition may be assigned more than one minor time frame within a given major time frame. A major time frame is a time window within which each partition is executed at least once. A minor time frame is a time window instance, or slice, that is allocated to each partition within a major time frame. Minor time frames are sequentially combined to form the major time frames. That is, each partition occupies one or more slices of time within the major time frame.

A partition may include for execution a set of periodic tasks and/or a set of aperiodic tasks. Periodic tasks 128 associated with a partition are executed each time a minor time frame starts a partition. Aperiodic tasks 130 are used to handle less time sensitive events and their execution may be distributed over multiple minor time frames. As a result, periodic tasks 128 are typically assigned a higher priority than aperiodic tasks. When the execution window of a time window instance terminates, the execution of the partition is preempted and next partition in the major time frame starts to execute. Partitions that were previously preempted continue execution in the next minor time frame in which they are scheduled to occur, and tasks in those partitions are re-executed in order of priority.

The system 110 may also include a terminal 140 that has a human machine interface (HMI) 142 through which a user may interact with the operating system 124 or one or more of the tasks 127. The terminal 140 may be implemented by various means such as, but not limited to, a computer, laptop or tablet computer, or other equipment. In the context of avionics implementations, the terminal 140 may comprise a cockpit multi-function display device, or a portable terminal such as, but not limited to, an electronic flight bag. The terminal 140 may be coupled to the computer system 110 via an interface 132. In various different embodiments, the interface 132 may be a wired or wireless interface and/or a network interface. The terminal 140 may be coupled to the interface 132 either directly, or indirectly such as through a proprietary network, an in-vehicle data network, or a public network (such as the Internet, for example), or through some combination of these alternatives. In some embodiments, the features discussed herein attributable to the terminal 140 and/or HMI 142 may be integrated within the computing system 110 itself rather than being a discrete device.

As previously mentioned, the computing system 110 further comprises an artificial intelligence (AI) coprocessor 150, which may also be referred to herein equivalently as an "inference engine", "compute processor" or "compute engine", for executing AI related applications and computations. In different embodiments, the AI coprocessor 150 may be implemented by a specialized processor, or compute engine, configured for performing mathematical operations repeatedly over multiple parallel computing paths, such as but not limited to, a graphic processing unit (GPU), a field-programable gate array (FPGA), an application specific integrated circuit (ASIC), a CPU (such as CPU0 or CPU1, for example) or any combination thereof. It should be understood that in some embodiments, the processor 120 and AI coprocessor 150 may be distinct hardware components that are independently implemented in hardware. In other embodiments, the processor 120 and AI coprocessor 150 are parts of an integrated hardware component, such as where they are both are implemented on the same processing chip or distinct processing cores of the same processing unit. Where the AI coprocessor 150 is implemented by a GPU, kernels may be configured for matrix computations for a DNN, and/or display related functions such as preparing and rendering graphics for display on the HMI 142. The AI coprocessor 150 may comprise, or is otherwise coupled to, a last-level cache (LLC) 152, through which it is also coupled to the memory 122. In some embodiments, the LLC 134 and LLC 152 may be implemented together as a common cache.

AI related processes executed by the AI coprocessor 150 are referred to herein as "kernels" as shown at 154. Kernels are also sometimes known as "shaders" in graphics processing applications. These kernels 154, in some embodiments, may be executed in timing window iterations concurrent to those implemented for executing processor 120 tasks. As an example, a kernel executed by the AI coprocessor 150 may include a process for implementing a deep neural network (DNN), graphics processing, deep learning (DL) processes, inference computations, or other machine learning or AI related models or tasks. In some embodiments, the AI coprocessor 150 may co-host multiple kernels 154, each executing its own DNN.

The kernels 154 are also scheduled for execution on the AI coprocessor 150 by the scheduler 126. In some embodiments, the processor 120 and AI coprocessor 150 are linked by a signal path 156 through which the processor 120 can configure and control aspects of AI coprocessor 150 operation. That is, the AI coprocessor 150 may be configured as a secondary processor under the authority of a primary processor (i.e., processor 120). In some embodiments, kernels 154 may be directly associated with one or more of the tasks 127, with the tasks 127 handing-off data to the kernels 154 to perform specialized processing. In other embodiments, one or more of the kernels 154 may execute processes independent of the tasks 127.

Processor 120 and AI coprocessor 150 are configured to access the memory 122, in some embodiments, via a memory bus 123. In some embodiments AI coprocessor 150 access to memory 122 is performed via a peripheral component interconnect express (PCIe) interface. The processor 120 and AI coprocessor 150 each execute read and write memory calls or transactions to the memory bus 123 to respectively retrieve data from the memory 122 and store data to the memory 122. In order to regulate transactions to the memory 122, computing system 110 further includes a processor bus monitor (BM) 160, an AI coprocessor bus monitor (BM) 162, an AI coprocessor rate limiter (RL) 164, and in some embodiments a processor rate limiter (RL) 165, which are each coupled to or otherwise interface with the memory bus 123. The processor bus monitor 160 and AI coprocessor bus monitor 162 each monitor and count the number of memory transactions to the memory bus 123 for the purpose of enforcing memory transaction quotas, as further discussed in detail below. The AI coprocessor rate limiter 164 further operates to selectively regulate the rate at which the AI coprocessor 150 can execute memory transactions to the memory bus 123, also as further discussed in detail below. The optional processor rate limiter 165 may be used to selectively regulate the rate at which the processor 120 can execute memory transactions to the memory bus 123. For example the optional processor rate limiter 165 may be utilized for avionics application scenarios where a process being performed on the AI coprocessor 150 has a high safety critical Design Assurance Level (DAL), such as DAL A, DAL B or DAL C, but the task on the CPU is relatively low-DAL, such as DAL D or DAL E.

With embodiments of the present disclosure, memory transaction quotas are allocated for executing processes on each of the cores of the processor 120 and the AI coprocessor 150 for a timing window iteration. These memory transaction quotas essentially serve as budgets defining how many memory calls or transactions the processes can execute to the memory, with each transaction counting against and depleting the respective budget. For example, the CPU0 and CPU1 would each be allocated a respective task memory transaction quota for executing tasks 127, and the AI coprocessor 150 allocated a respective compute processor memory transaction quota for executing kernels 154. In some embodiments, these memory transaction quotas may be initially allocated by the scheduler 126 at the start of each timing window iteration. In general, if a process exhausts its memory transaction quota for the timing window iteration, then its execution is stalled for a limited period of time until it receives a replenished budget for the next timing window iteration. If the processes running on one of the cores of the processor 120 completes execution earlier than the end of the current timing window iteration, then at least a portion of any remaining memory transaction quota for that core can be transferred for use by another computing resource accessing the memory 122.

Because the CPU0 and CPU1 are typically executing tasks that are real-time, safety critical, or of similar importance, the memory transaction quotas allocated to the CPU0 and CPU1 are tailored to be sufficient for those executed tasks to perform their execution during the timing window iteration without fully depleting their transaction budgets. That is they are provided a memory transaction quota allocation that takes into account the number of memory transaction they can be expected to take during the current timing window iteration assuming non-anomalous operations that do not exceed the worst case execution times (WCET) associated with the scheduled tasks.

The AI coprocessor 150, in contrast, executes kernels 154 that support less time critical functions than the safety critical functions performed by some of the tasks 127. For example, the kernels 154 may support image or sensor processing or graphical display generation functions that, while still important, will not result in vehicle instability (for example) or other adverse condition if a less than real-time processing latency is introduced. The AI coprocessor 150 may therefore be allocated a memory transaction quota for the kernels 154 based on what remaining number of memory transactions can reasonably be executed during the timing window iteration without causing a significantly delay to the parallel memory operations from the processor 120 applications (for example, that could lead to an increase in their WCET). That said, in some implementations, one or more kernels may support avionics functions such as aircraft visual auto-landing functions. Thus there may be scenarios where processing running on the AI coprocessor 150 have equal or higher priority than those executing on the processor 120 that are provided ample budgets to complete execution. If the AI coprocessor 150 exhausts its memory transaction quota, then execution of kernels is paused for a limited period. If it inherits the remaining memory transaction quota balance from another process that completed executing on the processor 120, then the kernel may continue its execution on the AI coprocessor 150 until it again exhausts its memory transaction quota (or until the current time window iteration expires). In some embodiments, the signal path 156 is utilized by the scheduler 126 to issue interrupts to the AI coprocessor 150 to control (schedule, pause and resume) the execution of kernels 154.

In some embodiments, processor bus monitor (BM) 160 is the element that monitors and counts memory transactions made to the memory 122 by tasks 127 executed by the processor 120. Likewise, AI coprocessor bus monitor (BM) 162 is the element that monitors and counts memory transactions made to the memory 122 by kernels 154 executed by the AI coprocessor 150. In some embodiments, the scheduler 126 allocates the memory transaction quotas as discussed above and communicates the quotes to the bus monitors 160, 162, which then keep track of remaining quota balances as tasks and kernels execute memory transactions as discussed herein.

The bus monitors 160, 162, in some embodiments, may also serve as the elements that function to inhibit further memory transactions by tasks and/or kernels once their respective quota balances are depleted. For example, the bus monitors 160, 162 may communicate depleted quota balances to the scheduler 126, which would then respond by suspending (pausing) execution of the associated tasks and/or kernels. In some embodiments, the bus monitor 160 may recognize when a task 127 completes execution during the timing window instance with a remaining balance in its memory transaction quota, and initiate a transfer of at least a portion of that remaining balance to the bus monitor 162 in order to permit further execution of one or more kernels on the AI coprocessor 150. In some embodiments, such a transfer of remaining quota balance may be controlled by the scheduler 126. It should be understood that in alternate embodiments, the functions of bus monitors 160, 162 may be implemented as hardware elements, or in software, or by a combination thereof In some embodiments, software, either running on the processor 120 or the AI coprocessor 150, periodically reads the bus monitors 160, 162 and throttles the AI coprocessor 150 accordingly such that it never exceeds its assigned memory transaction quota.

As mentioned above, the AI coprocessor rate limiter (RL) 164, operates to selectively regulate or throttle the rate at which kernels 154 executed by the AI coprocessor 150 can access (i.e., execute memory transactions to) the memory 122. Instead of permitting the kernels 154 to perform memory transactions at-will, the RL 164 caps or limits the rate at which memory transaction are performed between the AI coprocessor 150 and the memory bus 123. For example, the RL 164 may regulate to limit memory transactions to a rate of 100 Mbytes/sec, down from 1 Gbyte/sec possible rate. The RL 164 may function in conjunction with, or independent of, the bus monitor 162.

In some embodiments, if kernels 154 executing on the AI coprocessor 150 are the only active process currently executing during the timing window iteration, then the rate limiter as well as the AI coprocessor 150's memory transaction quota can be bypassed (e.g., disabled) and the kernels 154 allowed to perform memory transactions without limit. Similarly, in some embodiments, the rate limiter 164 as well as the AI coprocessor 150's memory transaction quota can also be bypassed (e.g., disabled) and the kernels 154 allowed to perform memory transactions without limit if kernels 154 are executing on the AI coprocessor 150 and only tasks 127 not categorized as safety-critical (such as aperiodic tasks 130, for example) are executing on the processor 120. In some embodiments, a regularly check is performed to confirm whether the memory transaction quota and rate limiter function can be bypassed.

Figure 2:
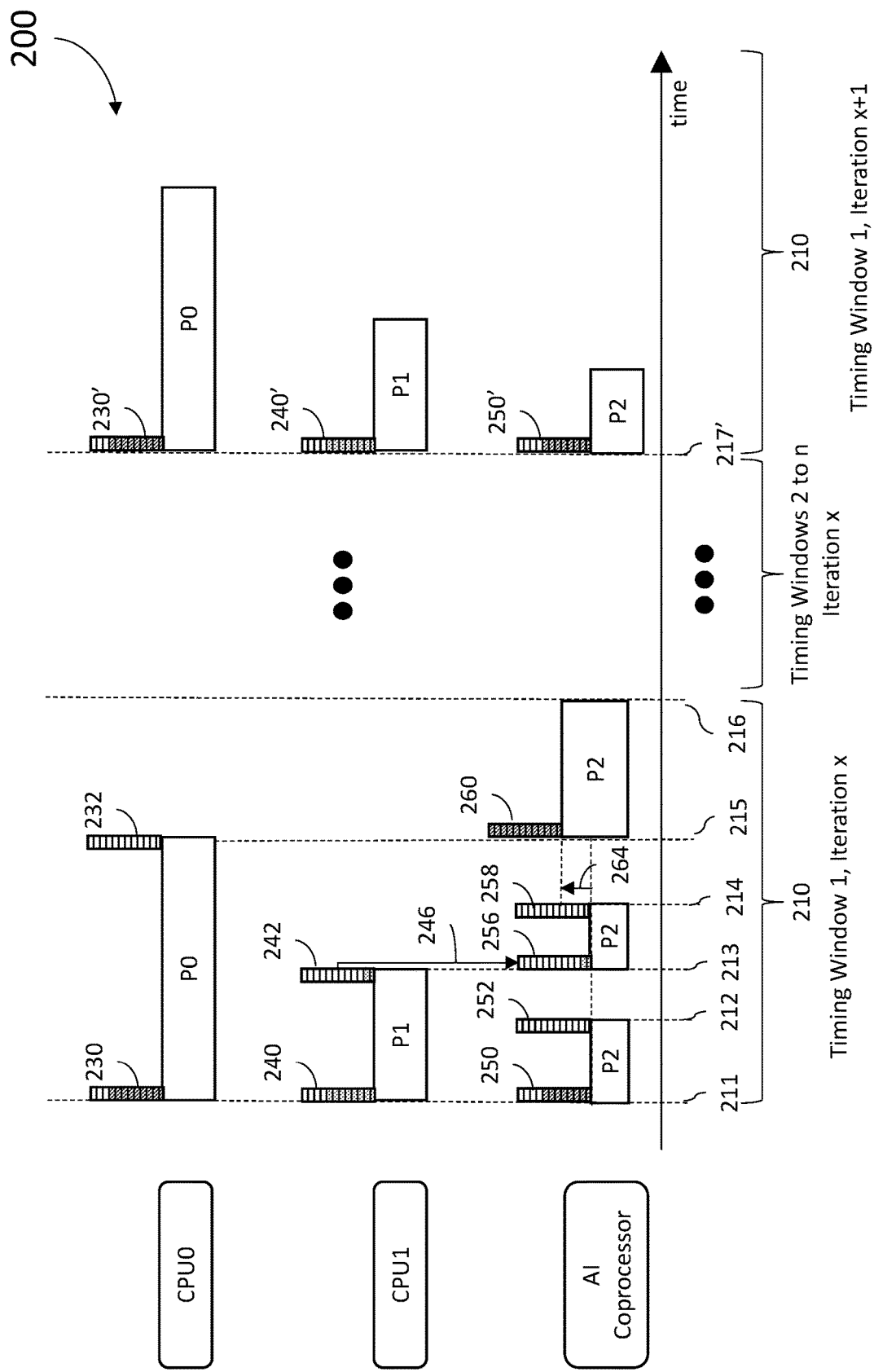

FIG. 2 illustrates at 200 an example timeline for an embodiment where processes are executed during a timing window iteration and managed based on memory transaction quotas. In FIG. 2, the CPU0, CPU1 and AI coprocessor are illustrated as each executing a respective process (P0, P1, P2) that is subject to a memory transaction quota. However, it should be understood that memory transaction quotas can be allocated either to the CPU0, CPU1 and AI coprocessor for executing processes thereon, or CPU and/or AI coprocessor quotas can be directly allocated to the processes themselves. For example, the processes P0, P1 or P2 may in some implementations each actually represent a set of individual processes each allocated a memory transaction quota. That said, counting and enforcing the memory transaction quota and/or limiting by the rate limiter or performed in the same manner regardless.

As shown at 211 a timing window instance 210 begins which comprising the first iteration of a timing window within which a process P0 is executed on the CPU0, a process P1 is executed on the CPU1, and a process P2 is executed on the AI coprocessor. Process P0 begins timing window instance 210 with an initial memory transaction quota shown at 230, process P1 begins timing window instance 210 with an initial memory transaction quota shown at 240, and process P2 begins timing window instance 210 with an initial memory transaction quota shown at 250. Since processes are actively being executed on CPU0 and CPU1, process P2 begins with the rate limiter 164 enabled and limiting the rate at which P2 can perform memory transactions to the memory 122.

Processes P0, P1 and P2 all commence execution and begin depleting their respective memory transaction quotas as they execute memory transactions. At 212, the execution of P2 is paused when it reaches a point where it has depleted its initial memory transaction quota (shown at 252). At 213, the CPU1 completes execution process P1 with a balance remaining in its initial memory transaction quota (shown at 242). This remaining memory transaction quota balance is transferred for use by P2 on the AI processor (shown at 246) partially replenishing the memory transaction quota for P2 (shown at 256). The process P2 therefore resumes execution on the AI coprocessor unit until at 214 its memory transaction quota is again depleted (shown at 258), where execution of P2 is again suspended.

At 215, process P0 completes its execution but has no remaining memory transaction quota (shown at 232) to donate to P2. That said, P0 and P1 have both completed their execution with time remaining in the timing window instance 210 with no other tasks running on CPU0 or CPU1 (or at least no tasks designated as critical tasks). The AI coprocessor can therefor resume execution of P2 at 215 until the end of the timing window instance 210 (shown at 216) without concern of causing latency in the execution of tasks by CPU0 or CPU1. The rate limiting of P2 can therefore be discontinued starting at 215. Moreover, tracking usage of the memory transaction quota by P2 can also be disabled. In some embodiments, disabling of a memory transaction quota can effectively be implemented through actions such as, disabling further counting of memory transaction, setting the memory transaction quota to infinity or other disproportionally high value, ignoring when the memory transaction quota becomes depleted, and/or other actions.

After 216, one or more other timing window instances for other timing windows may be scheduled and operate to regulate memory transactions in the same manner as discussed above for timing window instance 210. At 217, the next iteration of timing window 210 begins and the P0, P1 and P2 processed can begin execution again with replenished memory transaction quotas, shown at 230', 240' and 250'. In some instances, the scheduler 126 may be allocated to memory transaction quotas 230', 240' and 250' the same initial budgets as allocated for memory transaction quotas 230, 240 and 250 during the previous instance of the timing window. In other embodiments, different initial memory transaction quotas may be allocated.

Figure 3:
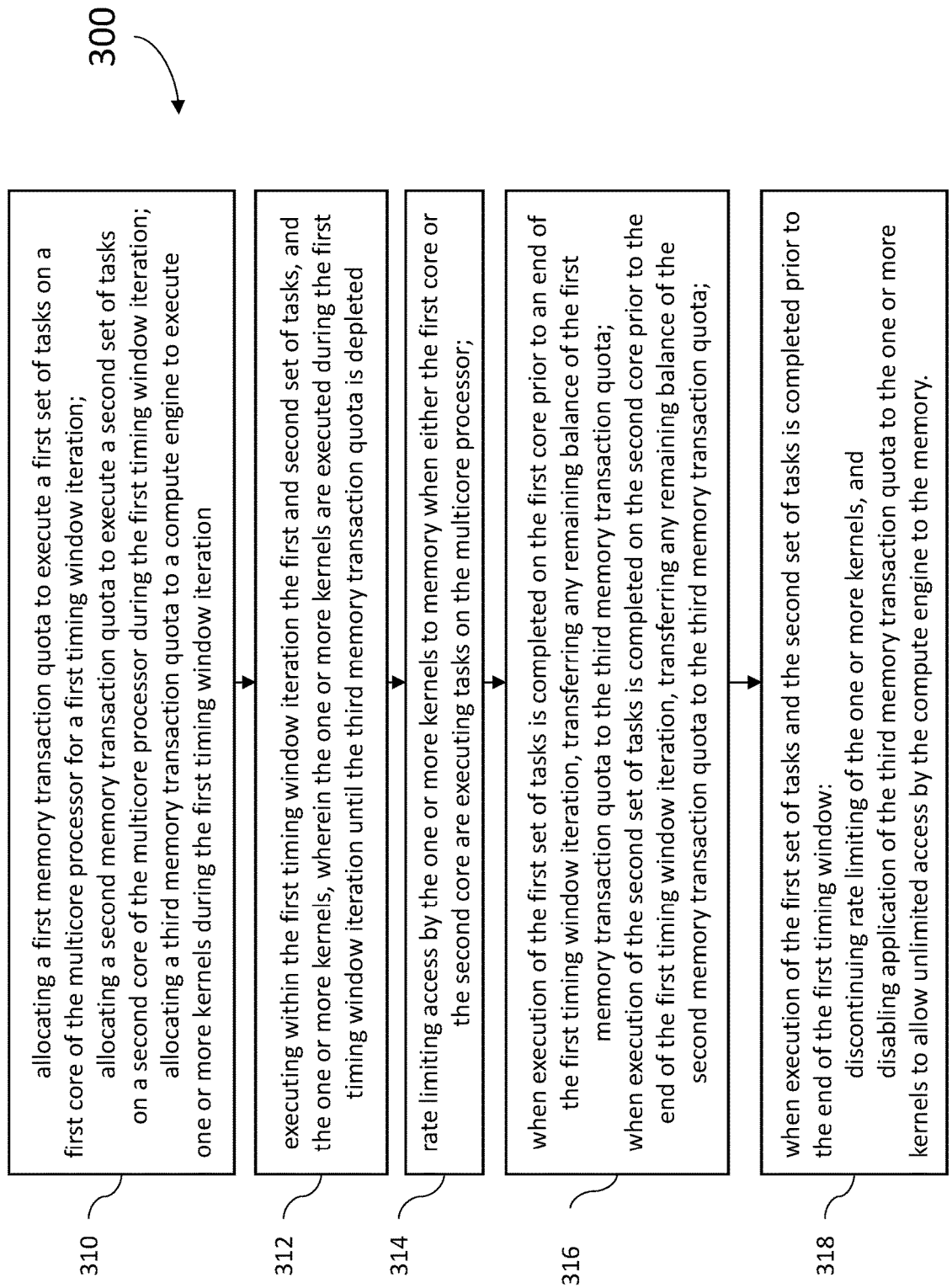
FIG. 3 is a flow chart illustrating a method for managing AI inference engine memory utilization in a system comprising a processor and a compute processor that share a common memory.

FIG. 3 is a flow chart diagram implementing an example method 300 for AI coprocessor memory transaction regulation. It should be understood that the features and elements described herein with respect to the method of FIG. 3 may be used in conjunction with, in combination with, or substituted for elements of any of the other embodiments discussed herein and vice versa. Further, it should be understood that the functions, structures, and other description of elements for embodiments described in FIG. 3 may apply to like or similarly named or described elements across any of the figures and/or embodiments describe herein and vice versa.

In one embodiment, the method 300 is a method for managing AI inference engine memory utilization in a system comprising a processor and a compute processor that share a common memory. The compute processor is configured to execute at least one kernel that includes a deep neural network (DNN) process. The processor and the compute processor each execute processes (tasks and kernels, respectively) during concurrent timing window iterations. The method 300 is described in terms of being an implementation for a multicore processor, but for a single core implementation steps for the addition cores are omitted or adapted to the single core.

The method begins at 310 with, for a first timing window allocation, allocating a first memory transaction quota used to execute a first set of tasks on a first core (e.g., CPU0) of the multicore processor for a first timing window iteration, allocating a second memory transaction quota used to execute a second set of tasks on a second core of the multicore processor (e.g. CPU1) during the first timing window iteration, and allocating a third memory transaction quota used to execute one or more kernels on compute engine.

The method proceeds to 312 with executing within the first timing window iteration, the first set of tasks and second set of tasks and the one or more kernels, wherein the one or more kernels are executed during the first timing window iteration until the third memory transaction quota is depleted (that is, as long as the third memory transaction quota is not depleted). As discussed above, memory bus monitors may be utilized to monitor and count memory transaction executed by the tasks and kernels, and initiate suspension of processes that deplete their memory transaction quota. In some embodiments, periodic tasks executed on the multi-core processor may be allocated sufficiently large memory transaction quotas that they are not expected to deplete them when operating within the bounds of their WCET design basis.

The method also proceeds to 314 with rate limiting access by the one or more kernels to the memory when either the first core or the second core are executing tasks on the multicore processor. In some embodiments, this may be more limited to rate limiting access by the one or more kernels to the memory when either the first core or the second core are executing periodic tasks on the multicore processor, or to when either the first core or the second core are executing designated critical tasks.

At 316, when execution of the first set of tasks is completed on the first core prior to an end of the first timing window iteration, transfer any remaining balance of the first memory transaction quota to the third memory transaction quota; and when execution of the second set of tasks is completed on the second core prior to the end of the first timing window iteration, transfer any remaining balance of the second memory transaction quota to the third memory transaction quota. As discussed above, the first set of tasks and second set of tasks can each include one or more tasks.

At 318, when execution of the first set of tasks and the second set of tasks is completed prior to the end of the first timing window, discontinue rate limiting of the one or more kernels, and disabling application of the third memory transaction quota to the one or more kernels to allow unlimited access by the compute engine to the memory. In some embodiments, disabling of a memory transaction quota is effectively implemented through actions such as, disabling further counting of memory transactions, setting the memory transaction quota to infinity or other disproportionally high value, ignoring when the memory transaction quota becomes depleted, and/or other actions. Similarly, in some embodiments, the rate limiting as well as the compute engine memory transaction quota can also be bypassed (discontinued or disabled) so that the kernels are allowed to continue to perform memory transactions without limit when the only tasks executing on the multicore processor are those not categorized as safety-critical (such as aperiodic tasks 130, for example).

It should be understood that for a discrete AI coprocessor, the memory architecture might be different than in the case of an integrated AI coprocessor in that, generally, a discrete AI coprocessor may comprise its own local high-speed memory (for AI coprocessors implemented by GPUs, such a memory is known as graphics double data rate (GDDR)). Direct memory access (DMA) by the discrete AI co-processor may be the compute processor's way that competes with the process for the memory, causing interference. In addition, it should be understood that kernels running on the AI co-processor may also compete against each other to access the local high-speed memory.

Figure 4:
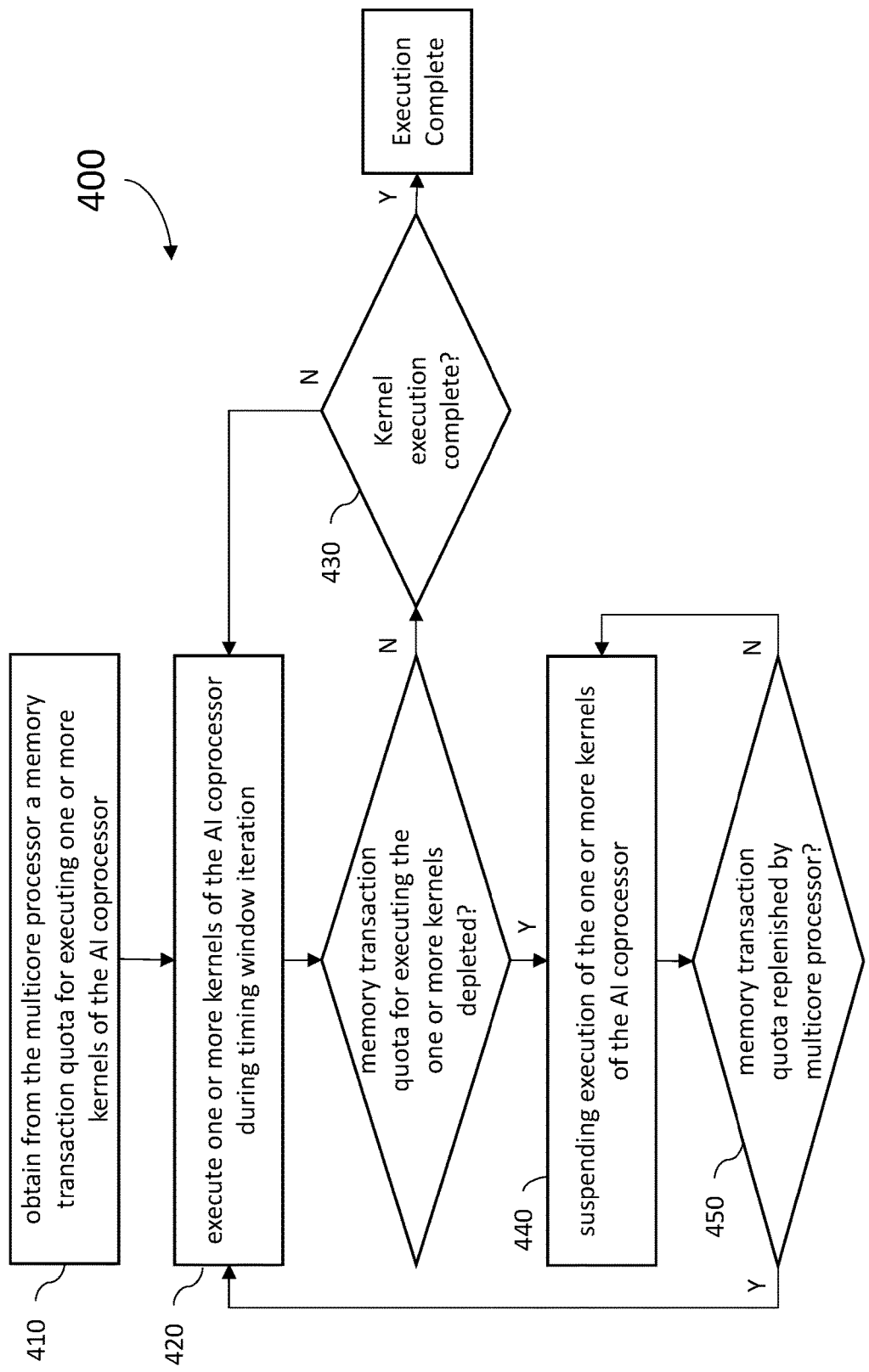
FIGS. 4 and 4A are flow charts illustrating a method for managing execution of a kernel on an AI inference engine that shares a common memory with a processor.
Figure 4A:
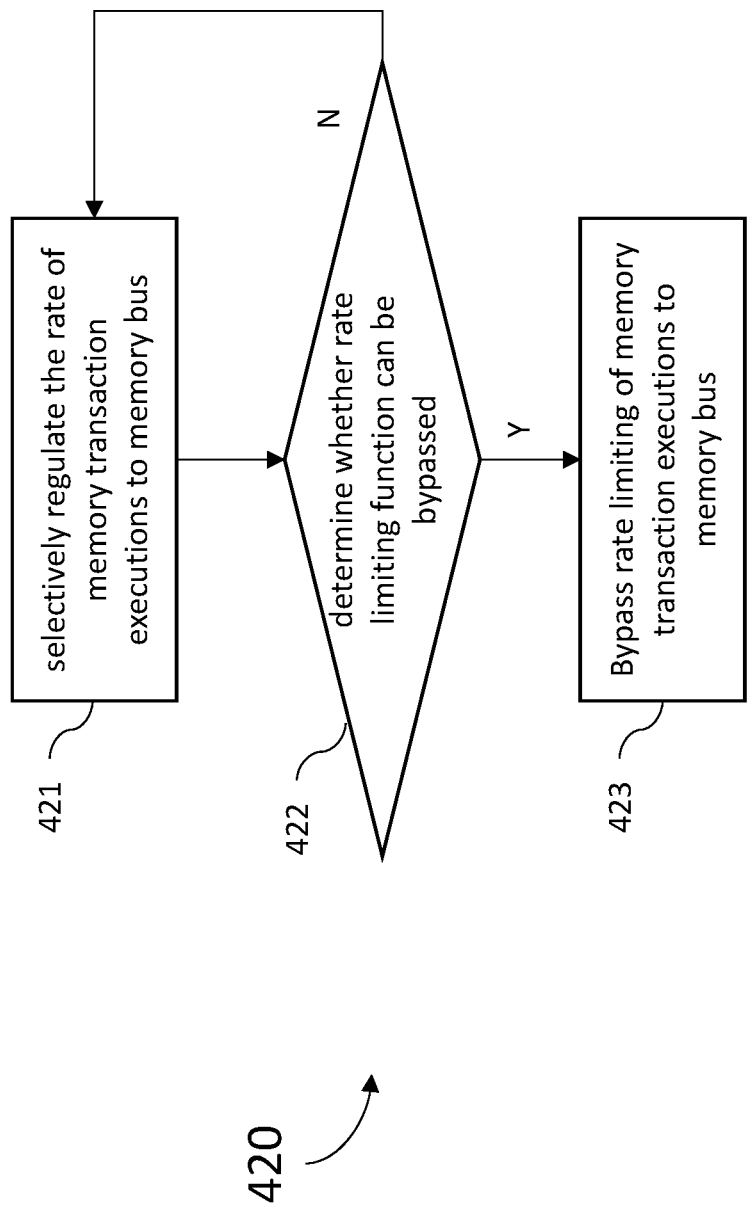

FIGS. 4 and 4A are flow chart diagrams implementing another example method 400 for AI coprocessor memory transaction regulation. It should be understood that the features and elements described herein with respect to the method of FIG. 3 may be used in conjunction with, in combination with, or substituted for elements of any of the other embodiments discussed herein and vice versa. Further, it should be understood that the functions, structures, and other description of elements for embodiments described in FIG. 3 may apply to like or similarly named or described elements across any of the figures and/or embodiments describe herein and vice versa.

In one embodiment, the method 400 is a process with respect to the execution of kernels on an AI inference coprocessor (e.g., a compute engine). In some embodiments, one or more elements of the method 400 may be implemented as code within a kernel itself. The method begins at 410 with obtaining from the multicore processor a memory transaction quota for executing one or more kernels on the AI coprocessor. The method proceeds to 420 with executing the one or more kernels on the AI coprocessor during timing window iteration. The kernels are executed during the window as long as their memory transaction quota is not completed. As such, the method may include monitoring and counting memory transactions by the one or more kernels and updating the memory transaction quota as memory transactions occur. The method thus proceeds to 430 with determining whether the memory transaction quota for executing the one or more kernels is depleted. If the determination at 430 is no, and the kernels still need processing to complete (checked at 431), then the method returns to 420 to continue execution of the kernel. If yes, then the method proceeds to 440 with suspending execution of the one or more kernels. The kernels will remain suspended until the end of the timing window iteration unless their memory transaction quota is replenished or application of the kernel's memory transaction quota is disabled. For example, the memory transaction quota may be replenished when a task running on the multicore processor completes execution with some balance of its memory transaction quota remaining, and that remaining balance is transferred to the memory transaction quota of the kernels. If the memory transaction quota remains in force but in a depleted state, the method returns to 440 where execution of the one or more kernels remains suspended. If the memory transaction quota is disabled or replenished, then the method returns to 420 to continue execution of the kernels.

FIG. 4A illustrates the implementation of rate limiting during execution of the one or more kernels at 420. At 421, the method selectively regulates the rate of memory transaction executions made to the memory bus. As mentioned above, rate limiting operates to selectively regulate or throttle the rate at which kernels executed by the AI coprocessor can access (i.e., execute memory transactions to) the memory. Instead of permitting the kernels to perform memory transactions at-will, the rate limiting caps or limits the rate at which memory transaction are performed between the AI coprocessor and the memory bus and/or memory. For example, rate limiting may regulate to limit memory transactions to a rate of 100 Mbytes/sec, down from 1 Gbyte/sec possible rate. The rate limiting may function in conjunction with, or independent of, the bus monitor. At 422, the method determines whether rate limiting can be bypassed. If not, then the method returns to 421 and continues the rate limiting. Otherwise, for example as discussed above, if kernels executing on the AI coprocessor are the only active process currently executing during the timing window iteration, then the process can proceed to 423 where the rate limiting can be bypassed (e.g., disabled) and the kernels the allowed to perform memory transactions without limit. Similarly, in some embodiments, rate limiting can also be bypassed and the kernels allowed to perform memory transactions without limit if kernels are executing on the AI coprocessor and only tasks not categorized as safety-critical (such as aperiodic tasks 130 or low DAL tasks, for example) are executing on the processor. Also as mentioned above, rate limiting may also optionally be implemented on the processor. That is, the process of FIG. 4A may be generalized to apply to rate limiting memory transactions by tasks implemented by the processor. Such a method may be utilized for avionics applications where a process being performed on the AI coprocessor has a high safety critical DAL, such as DAL A, DAL B or DAL C, but the task executing on the processor is relatively low-DAL, such as DAL D or DAL E.

EXAMPLE EMBODIMENTS

Example 1 includes a computing system, the system comprising: a processor comprising at least one core; a compute processor configured to execute one or more kernels; a memory coupled to the processor and the compute processor; wherein the computing system is configured to: allocate at least one task memory transaction quota to at least a first set of tasks executed on a first core of the processor; allocate at least one compute processor memory transaction quota for executing the one or more kernels on the compute processor; execute within a first timing window iteration the first set of tasks and the one or more kernels, wherein the one or more kernels are executed during the first timing window iteration until the at least one compute memory transaction quota for executing the one or more kernels on the compute processor is depleted; and regulate a rate of memory transaction access by the one or more kernels to the memory when the first set of tasks are executing on the processor.

Example 2 includes the system of Example 1, wherein the at least a first set of tasks comprises a first set of tasks executed on a first core of the processor and a second set of tasks executed on a second core of the processor; wherein to allocate the at least one task memory transaction quota, the computing system is configured to: allocate a first memory transaction quota to the first set of tasks executed on the first core of the processor and a second memory transaction quota to the second set of tasks executed on a second core of the processor.

Example 3 includes the computing system of any of Examples 1-2, wherein when execution of one or more tasks of the at least a first set of tasks is completed on a first core prior to an end of the first timing window iteration, the computing system transfers at least a portion of any remaining balance of the at least one task memory transaction quota allocated for the first core to the at least one compute processor memory transaction quota; and based on completion of the execution of all of the at least the first set of tasks prior to the end of the first timing window, the computing system discontinues regulating the rate of memory transaction access by the one or more kernels, and disabling application of the compute processor memory transaction quota to the one or more kernels to allow unlimited access by the compute engine to the memory.

Example 4 includes the computing system of any of Examples 1-3, further comprising a memory bus coupled to the processor and the compute processor, wherein the memory is coupled to the processor and the compute processor by the memory bus.

Example 5 includes the computing system of any of Examples 1-4, further comprising a scheduler executed by the processor, wherein the scheduler performs allocation of the at least one task memory transaction quota, and the at least one compute processor memory transaction quota.

Example 6 includes the computing system of Example 5, wherein the scheduler is a component of an operating system executed by the processor.

Example 7 includes the computing system of any of Examples 1-6, wherein the compute processor is configured to implement an artificial intelligence (AI) coprocessor and the one or more kernels comprise at least one deep neural network (DNN) process, one or more matrix operations, or point-wise mathematical operators.

Example 8 includes the computing system of any of Examples 1-7, wherein at least one kernel is configured to prepare and/or render graphics for display on a human machine interface (HMI)

Example 9 includes the computing system of any of Examples 1-8, wherein the first set of tasks and the second set of tasks comprise at least one of periodic tasks or aperiodic tasks.

Example 10 includes the system of any of Examples 1-9, comprising one or more bus monitors configured to monitor and count memory transactions, wherein the computing system selectively decreases the at least one task memory transaction quota and the compute processor based on memory transactions monitored by the one or more bus monitors.

Example 11 includes the method of any of Examples 1-10, wherein the processor and the compute processor each execute concurrent processes during the same timing windows.

Example 12 includes a method for managing memory utilization in a system comprising a processor and a compute processor that share a common memory, the method comprising: allocating at least one task memory transaction quota to at least a first set of tasks executed on a first core of the processor; allocating at least one compute processor memory transaction quota for executing the one or more kernels on the compute processor; executing within a first timing window iteration the first set of tasks and the one or more kernels, wherein the one or more kernels are executed during the first timing window iteration until the at least one compute processor memory transaction quota for executing the one or more kernels on the compute processor is depleted; and regulating a rate of memory transaction access by the one or more kernels to the memory when the first set of tasks are executing on the processor.

Example 13 includes the method of Example 12, wherein the at least a first set of tasks comprises a first set of tasks executed on a first core of the processor and a second set of tasks executed on a second core of the processor, the method further comprising: allocating a first memory transaction quota to a first set of tasks executed on a first core of the processor and a second memory transaction quota to a second set of tasks executed on a second core of the processor.

Example 14 includes the method of any of Examples 11-13, further comprising: when execution of one or more tasks of the at least a first set of tasks is completed on a first core prior to an end of the first timing window iteration, transferring at least a portion of any remaining balance of the at least one task memory transaction quota to the compute process memory transaction quota; and based on completion of execution of all of the at least the first set of tasks prior to the end of the first timing window, discontinuing regulation of the rate of memory transaction access of the one or more kernels, and disabling application of the compute processor memory transaction quota to the one or more kernels to allow unlimited access by the compute engine to the memory.

Example 15 includes the method of any of Examples 12-14, wherein the processor and the compute processor each execute processes during concurrent timing window iterations Example 16 includes the method of any of Examples 12-15, further comprising: executing a scheduler by the processor, wherein the scheduler performs allocation of the at least one task memory transaction quota, and the compute processor memory transaction quota.

Example 17 includes the method of Example 16, wherein the scheduler is a component of an operating system executed by the processor.

Example 18 includes the method of any of Examples 12-17, wherein the compute processor is configured to implement an artificial intelligence (AI) coprocessor and the one or more kernels comprise at least one deep neural network (DNN) process, one or more matrix operations, or point-wise mathematical operators.

Example 19 includes the method of any of Examples 12-18, further comprising: monitoring and counting memory transactions executed by the at least a first set of tasks and the one or more kernels; and selectively decreasing the at least one task memory transaction and the compute processor memory transaction quota based on the monitoring and counting memory transactions.

Example 20 includes the method of any of Examples 12-19, wherein the memory is coupled to the processor and the compute processor by a memory bus.

In various alternative embodiments, system and/or device elements, method steps, or example implementations described throughout this disclosure (such the computing system, terminal, HMI, single-core processor, multicore processor, CPUs, processing core(s), AI coprocessor, inference engine, compute engine, memory, cache, operating system, scheduler, interfaces, memory bus, bus monitor, rate limiter, or any controllers, processors, circuits, or sub-parts thereof, for example) may be implemented at least in part using one or more computer systems, field programmable gate arrays (FPGAs), or similar devices comprising a processor coupled to a memory and executing code to realize those elements, processes, or examples, said code stored on a non-transient hardware data storage device. An AI coprocessor can be integrated into silicon with CPU cores or can be a discrete part with its own memory. The strategies described herein can be applied to either system memory or the AI coprocessor's local memory. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random-access memory (RAM), or any other form of permanent, semi-permanent, or temporary memory storage system or device having a physical, tangible form. Program instructions include but are not limited to computer-executable instructions executed by computer system processors and hardware description languages such as Very High Speed Integrated Circuit (VHSIC) Hardware Description Language (VHDL).

As used herein, terms such as computing system, terminal, HMI, single-core processor, multicore processor, CPUs, processing core(s), AI coprocessor, inference engine, compute engine, memory, cache, operating system, scheduler, interfaces, memory bus, bus monitor, rate limiter, refer to the names of elements that would be understood by those of skill in the art of avionics and transportation industries and are not used herein as nonce words or nonce terms for the purpose of invoking 35 USC 112(f).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A computing system, the system comprising:
   a processor comprising at least one core;
   a compute processor configured to execute one or more kernels;
   a memory coupled to the processor and the compute processor;
   wherein the computing system is configured to:
      allocate at least one task memory transaction quota to at least a first set of tasks executed on a first core of the processor;
      allocate at least one compute processor memory transaction quota for executing the one or more kernels on the compute processor;
      execute within a first timing window iteration the at least a first set of tasks and the one or more kernels, wherein the one or more kernels are executed during the first timing window iteration until the at least one compute memory transaction quota for executing the one or more kernels on the compute processor is depleted; and
      regulate a rate of memory transaction access by the one or more kernels to the memory when the at least a first set of tasks are executing on the processor;
   wherein when execution of one or more tasks of the at least a first set of tasks is completed on a first core prior to an end of the first timing window iteration, the computing system transfers at least a portion of any remaining balance of the at least one task memory transaction quota allocated for the first core to the at least one compute processor memory transaction quota; and
   based on completion of the execution of all of the at least the first set of tasks prior to the end of the first timing window, the computing system discontinues regulating the rate of memory transaction access by the one or more kernels, and disabling tracking usage of the compute processor memory transaction quota to the one or more kernels to allow unlimited access by the compute processor to the memory.

2. The system of claim 1, wherein the at least a first set of tasks comprises a first set of tasks executed on a first core of the processor and a second set of tasks executed on a second core of the processor;

wherein to allocate the at least one task memory transaction quota, the computing system is configured to:
allocate a first memory transaction quota to the first set of tasks executed on the first core of the processor and a second memory transaction quota to the second set of tasks executed on a second core of the processor.

3. The computing system of claim 1, further comprising a memory bus coupled to the processor and the compute processor, wherein the memory is coupled to the processor and the compute processor by the memory bus.

4. The computing system of claim 1, further comprising a scheduler executed by the processor, wherein the scheduler performs allocation of the at least one task memory transaction quota, and the at least one compute processor memory transaction quota.

5. The computing system of claim 4, wherein the scheduler is a component of an operating system executed by the processor.

6. The computing system of claim 1, wherein the compute processor is configured to implement an artificial intelligence (AI) coprocessor and the one or more kernels comprise at least one deep neural network (DNN) process, one or more matrix operations, or point-wise mathematical operators.

7. The computing system of claim 1, wherein at least one kernel is configured to prepare and/or render graphics for display on a human machine interface (HMI).

8. The computing system of claim 1, wherein the first set of tasks and the second set of tasks comprise at least one of periodic tasks or aperiodic tasks.

9. The system of claim 1, comprising one or more bus monitors configured to monitor and count memory transactions, wherein the computing system selectively decreases the at least one task memory transaction quota allocated to the compute processor based on the memory transactions monitored by the one or more bus monitors.

10. The method of claim 1, wherein the processor and the compute processor each execute concurrent processes during the first timing window iterations.

11. A method for managing memory utilization in a system comprising a processor and a compute processor that share a common memory, the method comprising:
allocating at least one task memory transaction quota to at least a first set of tasks executed on a first core of the processor;
allocating at least one compute processor memory transaction quota for executing the one or more kernels on the compute processor;
executing within a first timing window iteration the first set of tasks and the one or more kernels and the one or more kernels, wherein the one or more kernels are executed during the first timing window iteration until the at least one compute processor memory transaction quota for executing the one or more kernels on the compute processor is depleted;
regulating a rate of memory transaction access by the one or more kernels to the memory when the first set of tasks are executing on the processor; and
when execution of one or more tasks of the at least a first set of tasks is completed on a first core prior to an end of the first timing window iteration, transferring at least a portion of any remaining balance of the at least one task memory transaction quota to the compute processor memory transaction quota; and
based on completion of execution of all of the at least the first set of tasks prior to the end of the first timing window, discontinuing regulation of the rate of memory transaction access by the one or more kernels, and disabling tracking usage of the compute processor memory transaction quota to the one or more kernels to allow unlimited access by the compute processor to the memory.

12. The method of claim 11, wherein the at least a first set of tasks comprises a first set of tasks executed on a first core of the processor and a second set of tasks executed on a second core of the processor, the method further comprising:
allocating a first memory transaction quota to a first set of tasks executed on a first core of the processor and a second memory transaction quota to a second set of tasks executed on a second core of the processor.

13. The method of claim 11, wherein the processor and the compute processor each execute processes during the first timing window iteration.

14. The method of claim 11, further comprising:
executing a scheduler by the processor, wherein the scheduler performs allocation of the at least one task memory transaction quota, and the compute processor memory transaction quota.

15. The method of claim 14, wherein the scheduler is a component of an operating system executed by the processor.

16. The method of claim 11, wherein the compute processor is configured to implement an artificial intelligence (AI) coprocessor and the one or more kernels comprise at least one deep neural network (DNN) process, one or more matrix operations, or point-wise mathematical operators.

17. The method of claim 11, further comprising:
monitoring and counting memory transactions executed by the at least a first set of tasks and the one or more kernels; and
selectively decreasing the at least one task memory transaction allocated to the compute processor memory transaction quota based on the monitoring and counting the memory transactions.

18. The method of claim 11, wherein the memory is coupled to the processor and the compute processor by a memory bus.

* * * * *